(12) United States Patent
Michalak et al.

(10) Patent No.: US 11,443,248 B2
(45) Date of Patent: Sep. 13, 2022

(54) AUTOMATED SCHEDULING OF EVENTS WITH MULTIPLE PERFORMERS

(71) Applicant: TIMESLOTS LLC, Rocky River, OH (US)

(72) Inventors: John Michalak, Rocky River, OH (US); Dan Cull, Rocky River, OH (US); Troy Nethken, Rocky River, OH (US); Corey Fleming, Rocky River, OH (US); Tas Nadas, Rocky River, OH (US)

( * ) Notice: Subject to any disclaimer, the term of this patent is extended or adjusted under 35 U.S.C. 154(b) by 22 days.

(21) Appl. No.: 16/915,230

(22) Filed: Jun. 29, 2020

(65) Prior Publication Data

US 2020/0410409 A1 Dec. 31, 2020

Related U.S. Application Data

(60) Provisional application No. 62/868,393, filed on Jun. 28, 2019.

(51) Int. Cl.
*G06Q 10/02* (2012.01)
*G06F 16/955* (2019.01)
*G06Q 10/06* (2012.01)
*G06Q 10/10* (2012.01)

(52) U.S. Cl.
CPC ......... *G06Q 10/02* (2013.01); *G06F 16/9554* (2019.01); *G06Q 10/06311* (2013.01); *G06Q 10/109* (2013.01)

(58) Field of Classification Search
CPC ............ G06Q 10/02; G06Q 10/06311; G06Q 10/109; G06F 16/9554

USPC ............................................................ 705/5
See application file for complete search history.

(56) References Cited

U.S. PATENT DOCUMENTS

| | | | | |
|---|---|---|---|---|
| 9,646,101 | B1* | 5/2017 | Wu | G06F 16/954 |
| 10,009,663 | B1* | 6/2018 | Hoffman | H04N 21/8358 |
| 10,268,751 | B2* | 4/2019 | Kim | G06F 16/487 |
| 10,438,152 | B1* | 10/2019 | Deflaux | G06Q 10/103 |
| 2003/0187802 | A1* | 10/2003 | Booth | G06Q 40/00 705/59 |
| 2008/0046913 | A1* | 2/2008 | Dear | G06Q 30/02 725/24 |
| 2009/0013263 | A1* | 1/2009 | Fortnow | G06Q 10/10 715/753 |

(Continued)

OTHER PUBLICATIONS

"Customer Purchase Intent Prediction Under Online Multi-Channel Promotion: A Feature-Combined Deep Learning Framework" Published by IEEE (Year: 2019).*

*Primary Examiner* — Zeina Elchanti
(74) *Attorney, Agent, or Firm* — Tarolli, Sundheim, Covell & Tummino LLP

(57) ABSTRACT

Systems and methods are provided for assigned a plurality of timeslots for an event to a plurality of performers. A plurality of ticket requests from a plurality of computing devices are tracked at a server. Each ticket request includes an indicator representing at least one of the plurality of performers. A score is assigned to each of the plurality of performers based on the indicators associated with each performer across the plurality of ticket requests. A plurality of timeslots for the event are assigned to the plurality of performers according to the determined score for each of the plurality of performers.

4 Claims, 3 Drawing Sheets

(56) References Cited

U.S. PATENT DOCUMENTS

| | | | | |
|---|---|---|---|---|
| 2009/0042607 | A1* | 2/2009 | Adachi | H04H 60/37 455/556.1 |
| 2009/0287545 | A1* | 11/2009 | Albright | G06Q 30/02 705/14.4 |
| 2012/0246072 | A1* | 9/2012 | Ligtenberg | G06Q 30/06 705/44 |
| 2013/0173317 | A1* | 7/2013 | Higgy | G06Q 10/02 705/5 |
| 2014/0270181 | A1* | 9/2014 | Siciliano | H04S 7/00 381/17 |
| 2015/0153998 | A1* | 6/2015 | Megias | G06F 3/165 700/94 |
| 2015/0278769 | A1* | 10/2015 | Zamer | G06Q 10/1095 705/7.19 |
| 2015/0287119 | A1* | 10/2015 | Bhan | G06Q 30/0629 705/5 |
| 2015/0331900 | A1* | 11/2015 | Attwell | G06F 16/4387 707/691 |
| 2016/0148126 | A1* | 5/2016 | Paleja | G06Q 30/0245 705/5 |
| 2016/0191653 | A1* | 6/2016 | Aluotto | H04L 51/34 709/205 |
| 2017/0068910 | A1* | 3/2017 | Burroughs | G06Q 30/0601 |
| 2017/0178034 | A1* | 6/2017 | Skeen | G06Q 20/384 |
| 2017/0236364 | A1* | 8/2017 | Heathcote | G07F 17/3227 463/20 |
| 2017/0337761 | A1* | 11/2017 | Dunnington | G06Q 30/0201 |
| 2018/0063589 | A1* | 3/2018 | Chand | H04N 21/2187 |

\* cited by examiner

AUTOMATED SCHEDULING OF EVENTS WITH MULTIPLE PERFORMERS

CROSS-REFERENCE TO RELATED APPLICATIONS

This application claims the benefit of U.S. Provisional Patent Application No. 62/868,393, filed Jun. 28, 2019, entitled SCHEDULING EVENTS WITH MULTIPLE PERFORMERS. The subject matter of this application is incorporated herein by reference in its entirety.

TECHNICAL FIELD

The present disclosure relates generally to automated event planning and, more specifically, to devices, systems, and methods for scheduling events having multiple performers.

BACKGROUND

In some events, there is a single lead performer who is expected to be the major reason for attendance for most of the audience, as well as one or more lesser-known front acts that generally perform prior to the lead performer. In other events, however, multiple performers may be booked with similar perceived levels of popularity, and the appropriate timeslots for the various performances maybe less apparent. In practice, scheduling performers for these events is performed on an ad hoc basis by the event organizer.

SUMMARY

In one example, a system includes a processor, a network interface; and a non-transitory computer readable medium storing machine executable instructions for assigning a plurality of time slots for an event to a plurality of performers. The executable instructions, when executed by the processor, provide a ticket portal and an event scheduler. The ticket portal is configured to receive a plurality of ticket requests via the network interface. Each ticket request includes an indicator associated with at least one of the plurality of performers. The event scheduler is configured to assign each of the plurality of time slots to one of the plurality of performers based on the indicators from the plurality of ticket requests.

In another example, a method is provided. A plurality of ticket requests from a plurality of computing devices are tracked at a server. Each ticket request includes an indicator representing at least one of the plurality of performers. A score is assigned to each of the plurality of performers based on the indicators associated with each performer across the plurality of ticket requests. A plurality of timeslots for the event are assigned to the plurality of performers according to the determined score for each of the plurality of performers.

In a further example, another method is provided. For each of the plurality of performers, a uniform resource link (URL) from which the ticket portal can be accessed is generated to provide a plurality of URLs. A plurality of ticket requests from a plurality of computing devices are received at a server via an Internet connection via the plurality of URLs. For each of the plurality of URLs, a number of ticket requests received from the URL is recorded, and the plurality of performers are ranked according to the number of ticket requests received from their respective URLs to provide a ranking of the plurality of performers. A plurality of timeslots for the event are assigned to the plurality of performers according to the ranking of the plurality of performers.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

In the context of the present disclosure, the singular forms "a," "an" and "the" can also include the plural forms, unless the context clearly indicates otherwise. The terms "comprises," "includes," "comprising," and/or "comprising," as used herein, can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items. The term "based on" means based at least in part on. Additionally, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the term "performer" refers to an entity that performs an act, which can include any of oratory, comedy, theater, music, poetry, dance, skills exhibitions, animal training, science demonstrations, acrobatics, magic, or a similar performance before an audience. The performer can be an individual or a group of multiple, affiliated individuals performing concurrently or subsequently.

The present disclosure relates generally to scheduling performance times for events having multiple performers. Specifically, the systems and methods disclosed herein track the ticket sales attributable to each of the multiple performers and assign the timeslots to the performers according to the ticket sales attributable to each performer.

Figure 1:
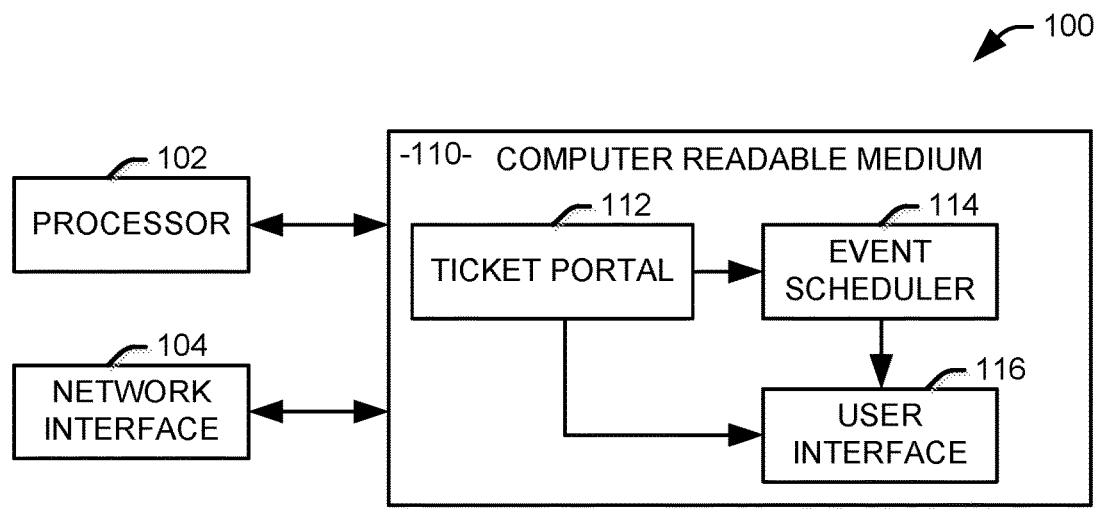
FIG. 1 is a block diagram of an example of a system that schedules performance times for events having multiple performers.

One aspect of the present disclosure, as shown in FIG. 1, can include a system 100 that schedules performance times for events having multiple performers. The system 100 includes a processor 102, a network interface 104, and a non-transitory computer readable medium 110 storing executable instructions to facilitate the performance of operations and/or implement the functions of one or more components of the system. The system 100 can be implemented as a general-purpose computer, special purpose computer, and/or other programmable data processing apparatus. Accordingly, the non-transitory memory 110 can be any non-transitory medium that contain or store the program for use by or in connection with the instruction or execution of a system, apparatus, or device. For example, the non-transitory memory 110 can be an electronic, magnetic, optical, electromagnetic, infrared, semiconductor system, apparatus or device, a portable computer diskette, a random access memory, a read-only memory; an erasable programmable read-only memory (or Flash memory), or a portable compact disc read-only memory.

The non-transitory memory 110 can store components of the event scheduling tool that are executable by the processor 102. A ticket portal 112 processes ticket purchases for the event via the network interface 104. As a result, the ticket portal 104 can include, for example, hypertext mark-up language (HTML) pages containing information about the event, a payment portal, or link to an affiliated payment portal, such as Stripe or PayPal, that receives payment information from the purchaser, and a database indicating the availability of one or more types of tickets within the venue. Each ticket request received at the ticket portal includes an indicator identifying at least one of the plurality of performers.

In one implementation, each performer is assigned a unique uniform resource link (URL) to include in advertisements for the event, and the indicator can be assigned according to the URL from which the ticket portal was accessed. Alternatively, the purchaser can simply select a performer from the plurality of performers associated with the event to whom the ticket purchase can be credited at the time of purchase. In another implementation, the purchaser is given a plurality of votes that can be assigned among the plurality of performers as desired. For example, the number of votes can be based on a number of tickets purchased, a total price of the tickets purchased, a category of tickets purchased, or a combination of these factors. In still another implementation, the purchaser is invited to rank the performers in order of preference.

The indicators are provided to an event scheduler 114 configured to assign each of a plurality of time slots associated with the event to one of the plurality of performers based on the indicators from the ticket requests. In one implementation, the plurality of timeslots can be ranked in order of desirability by an organizer of the event. In this implementation, the performers can be ranked from the indicators received from the purchasers by an appropriate voting system, and the timeslots can be assigned to the highest ranked performers in order of desirability. For example, where one or votes are assigned by the purchaser, the performers can be ranked according to a number of votes received.

Where the performers are ranked by the purchaser, a number of points can be assigned for each rank, and the performers are assigned in order of points obtained. Alternatively, a ranked-choice voting system could be used, in which each position in the ranking is determined via an instant-runoff vote. In this system, the votes are tallied according to the highest-ranked remaining choice on each purchaser's list. If no single performer wins a threshold number of votes, for example, fifty percent, then the performer with the lowest number of votes is eliminated from consideration at this position in the ranking, and another round of votes are tallied. If a purchaser's first choice is eliminated, then the vote goes to the purchaser's second choice, and so on until a performer receives the threshold number of votes and is selected. In practice, other voting systems can be used to provide the ranking of the performers, depending on the specific application.

Once the performers have been ranked, the performers can be assigned to the various timeslots within the event. In one implementation, the timeslots are ranked in order of desirability by the event organizer, and the timeslots are simply assigned to the performers in order of desirability. In another implementation, each performer can list the timeslots in the order of preference, and each performer is given a highest remaining timeslot from their list in the order in which they are ranked. Finally, each performer can be contacted, via the network interface 104, after the ranking of the performers, in the order in which they are ranked, to select a desired timeslot in which to perform. In each of these examples, it is assumed that the duration of the timeslots is fixed. In one example, however, the duration of each timeslot can be variable based on the number of votes received by the performer. For example, a performer receiving more than a first threshold percentage of votes or points during ranking can receive an extended timeslot at the expense of a performing receiving less than second threshold percentage of votes. Once the ranking has been determined, it can be presented to a user for review at an associated display or similar output device (not shown) via a user interface 106.

Figure 2:
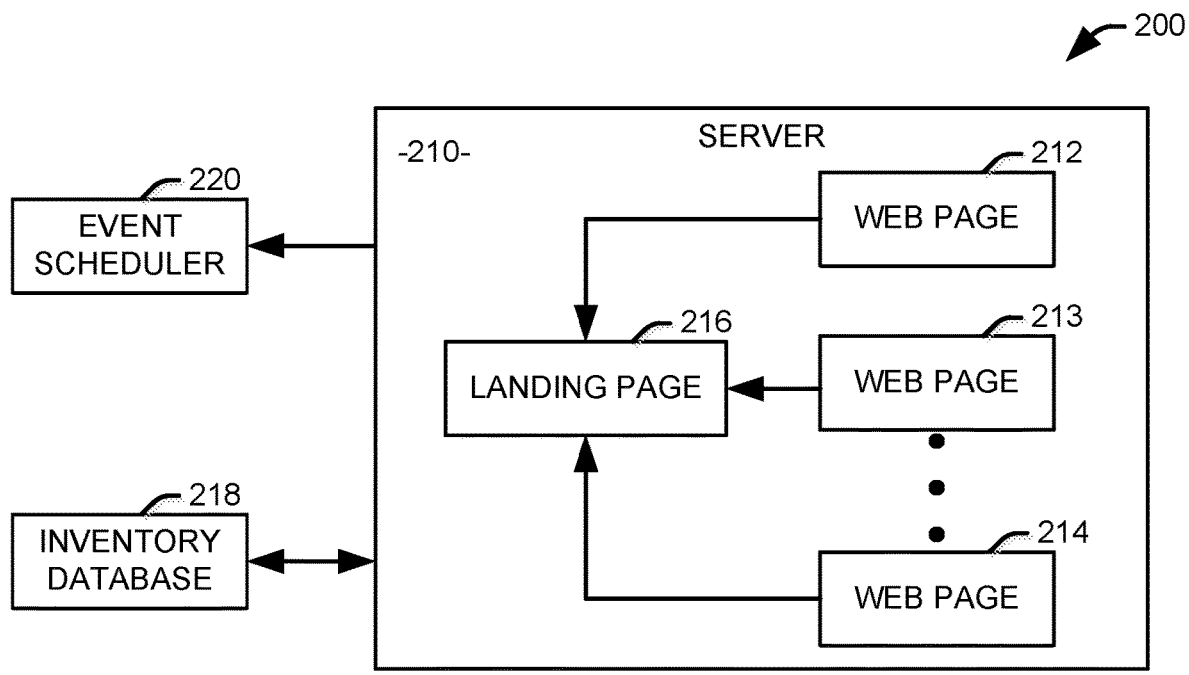
FIG. 2 is a schematic diagram of an example of a system for scheduling performance times for events having multiple performers in a manner that does not require the explicit participation of the purchaser.

In some events, the performers themselves take part in promoting an event, for example, by distributing flyers, hanging posters, or making social media posts. An organizer might wish to reward performers for their efforts in promoting an event, as opposed to merely selecting a most popular performer. In such a case, the purchaser's self-reported source of the referral could be consciously or subconsciously influenced by the popularity of the performers. FIG. 2 is a schematic diagram of an example of a system 200 for scheduling performance times for events having multiple performers in a manner that does not require the explicit participation of the purchaser. Specifically, the system 200 generates a unique uniform resource link (URL) for each of the plurality of performers from which the ticket portal can be accessed. The indicator representing the performer can be assigned to a given ticket request according to the specific URL used to access the ticket portal, allowing the indicator to be assigned to the ticket request in a manner opaque to the purchaser.

The system 200 includes a server 210 that receives and responds to HTTP requests for pages on one or more domains, receives ticket requests from user devices and, in some implementations, processes payments. The server can each be implemented on a dedicated server, a shared server, or a virtual server to provide one possible implementation of the ticket portal 112 of FIG. 1. User devices may include, for example, personal computers, smartphones, tablets, or similar devices for accessing the Internet. The server 210 hosts a plurality of web pages 212-214 associated with the unique URLs assigned to the plurality of performers. The server 210 is configured to redirect a user accessing any of the plurality of web pages 212-214 associated with the unique URLs assigned to the plurality of performers to a landing page 216 associated with the ticket portal. The redirect can be performed by any appropriate method including specific rules associated with the configuration of the web server 210 (e.g., via .htaccess), embedding a redirection command into the hypertext markup language (HTML) header code of the web pages 212-214, a script that is run by the page (e.g., implemented via Javascript), or a redirect service.

At the landing page 216, the page from which the purchaser was redirected can be recorded, for example, by tracking the referring web page for each purchaser accessing the landing page 216, to provide an indicator associated with each ticket request. The landing page 216 provides information about the event, a payment portal, or link to an affiliated payment portal, such as Stripe or PayPal, that receives payment information from the purchaser. In practice, the server 210 can query a local or remote database 218 indicating the availability of one or more types of tickets for the event.

The indicators for each request are provided to an event scheduler 220 configured to assign each of a plurality of time slots associated with the event to one of plurality of performers. It will be appreciated that the event scheduler 220 can be implemented at the server 210 or on another local or remote computing device (not shown) that is operatively connected to the server 210 via a local bus or network connection. In the illustrated example, each requested ticket from a URL associated with a given one of the plurality of performers is credited to the performer, providing, in aggregate, a score for that performer. It will be appreciated, however, that the ticket request could be credited to the performer based on a number of requests from that URL (regardless of the number of tickets purchased), a total value of the tickets requests associated with the URL, a weighted sum of the number of tickets, for example, weighted by a value of the tickets, or another appropriate method. Once sales have closed or a selected deadline for accumulating new indicators has passed, the performers are ranked according to their accumulated score.

Once the performers have been ranked, the performers can be assigned to the various timeslots within the event. In the illustrated implementation, the timeslots are ranked in order of desirability by the event organizer, and the timeslots are simply assigned to the performers in order of desirability. In another implementation, each performer can list the timeslots in the order of preference, and each performer is given a highest remaining timeslot from their list in the order in which they are ranked. Finally, each performer can be contacted in the order in which they are ranked to select a desired timeslot in which to perform. Once the ranking has been determined, it can be presented to a user for review, either via an electronic message, a display at a local device, or a summary page stored at the server and accessible by the user.

Figure 3:
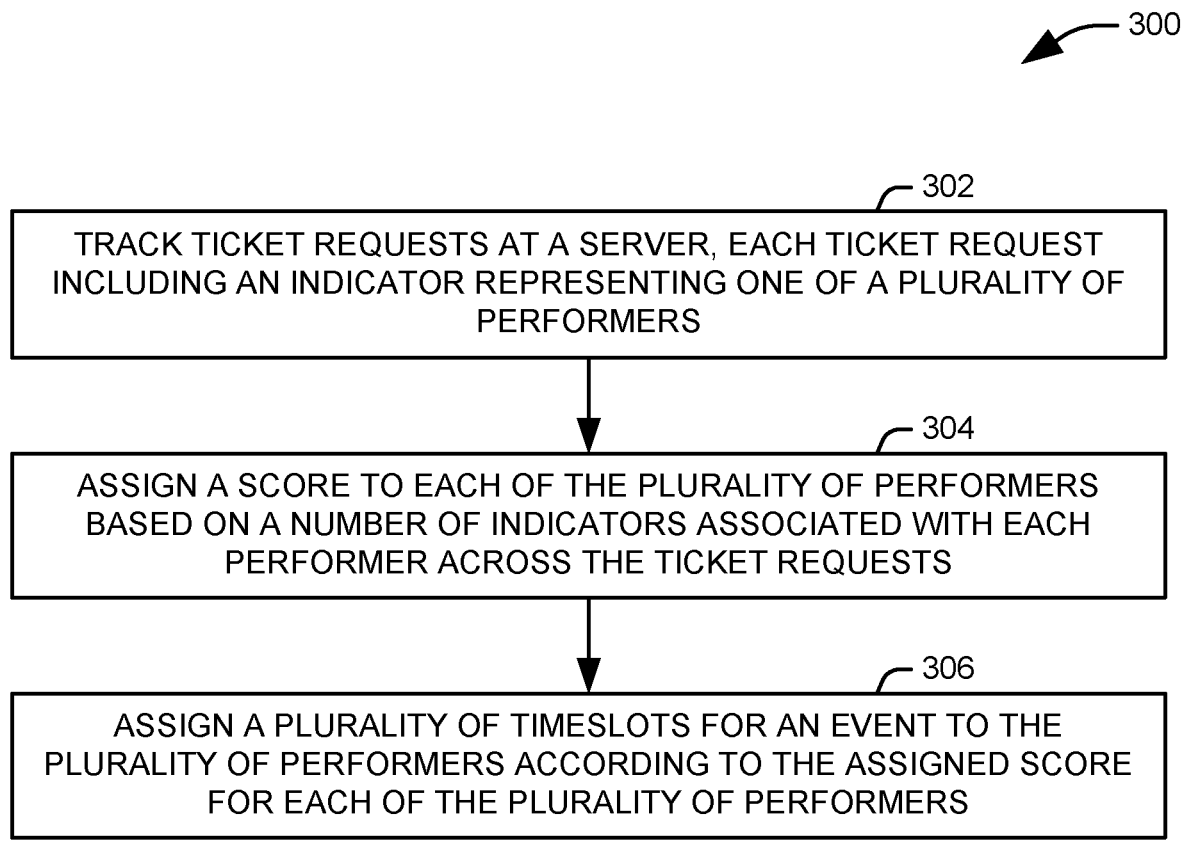
FIG. 3 illustrates one example of a method for scheduling performance times for multiple performers in an event.
Figure 4:
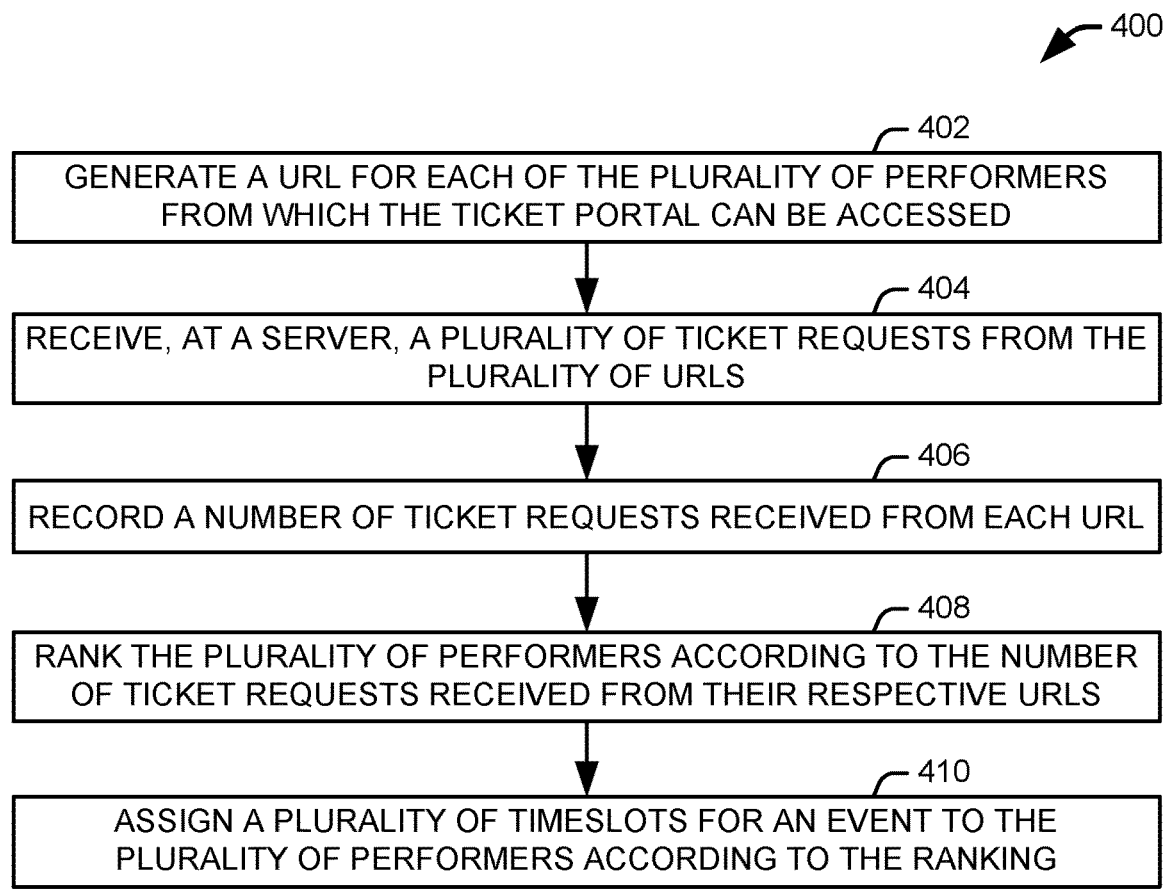
FIG. 4 illustrates another example of a method for scheduling performance times for multiple performers in an event.

In view of the foregoing structural and functional features described above, example methods will be better appreciated with reference to FIGS. 3 and 4. While, for purposes of simplicity of explanation, the example method of FIGS. 3 and 4 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

Further, blocks and combinations of blocks in FIGS. 3 and 4 can be implemented by computer program instructions. These computer program instructions can be stored in memory and provided to a processor of a general purpose computer, special purpose computer, and/or other programmable data processing apparatus to produce a machine, such that the instructions, which execute via the processor of the computer and/or other programmable data processing apparatus, create mechanisms for implementing the steps/acts specified in the flowchart blocks and/or the associated description. In other words, the steps/acts can be implemented by a system comprising a processor that can access the computer-executable instructions that are stored in a non-transitory memory.

The methods 300 and 400 can be implemented in hardware and/or in software (including firmware, resident software, micro-code, etc.). Furthermore, aspects of the present disclosure may take the form of a computer program product on a computer-usable or computer-readable storage medium having computer-usable or computer-readable program code embodied in the medium for use by or in connection with an instruction execution system. A computer-usable or computer-readable medium may be any non-transitory medium that can contain or store the program for use by or in connection with the instruction or execution of a system, apparatus, or device. As an example, executable code for performing the methods 300 and 400 can be stored in a non-transitory memory of a computing device and executed by a processor of the computing device and/or another computing device.

Referring now to FIG. 3, a method 300 for scheduling performance times for multiple performers in an event. At 302, ticket requests are tracked at a server. Each ticket request has an indicator representing at least one of the plurality of performers. In one implementation, the indicator is assigned to each ticket request at the ticket portal according to a uniform resource link (URL) from which the ticket portal was accessed. In another example, the indicator is assigned by a purchaser associated with the ticket request. For example, the ticket portal can allow the purchaser to assign a number of votes to across the plurality of performers, for example, either a single vote, a number of votes based on a number of tickets purchased in the ticket request, or a number of votes is based on a total price of the ticket request.

At 304, a score is assigned to each of the plurality of performers based on based on the indicators associated with each performer across the plurality of ticket requests. It will be appreciated that the score can be determined on a ratio scale or an ordinal scale, in which the performers are ranked relative to one another. The score can be assigned according to a number of votes for each performer, where votes are assigned by the purchaser, rankings assigned by the purchaser, a total value of ticket purchases from a URL associated with the performer, a total number of tickets purchased from a URL associated with the performer, and a weighted sum of tickets, with the weights varying across various categories of tickets, purchased from a URL associated with the performer.

At 306, a plurality of timeslots for the event are assigned to the plurality of performers according to the assigned score for each of the plurality of performers. In one example, in which the score is determined on a ratio scale, a plurality voting system is used in which the performer with the highest score is given a highest priority, the performer with the second-highest score is given a second priority, and so forth. Alternatively, a ranked choice or approval voting system can be used, with the voting system applied multiple times to select a performer as highest priority, second priority, and so forth.

Once the performers are ranked, the timeslots are assigned to the performers in order of priority. In one implementation, each performer is contacted by the system, via an appropriate network interface, in the order in which they are ranked to allow each performer to select one of the plurality of time slots. Instead of contacting the performers, each performer can submit a ranking of the timeslots, and the top remaining choice for each performer can be assigned in order of priority. In another implementation, each of the plurality of time slots is ranked by the event organizer, and the time slots are assigned, in order of rank, to the plurality of performers according to the determined priorities. Once the timeslots have been assigned, they can be displayed to a user for review and sent to the performers via the network interface.

FIG. 4 illustrates another example of a method 400 for scheduling performance times for multiple performers in an event. At 402, a uniform resource link (URL) from which the ticket portal can be accessed is generated for each of the plurality of performers to provide a plurality of URLs. Each of these URLs can be represented by a web page that redirects a ticket purchaser to a common landing page in such a way that an indicator associated with the URL can be generated and used to identify the associated performer. In one example, a quick response (QR) code can also be generated for each of the plurality of URLs. Accordingly, a computing device can access the unique URL for one of the plurality of performers by capturing an image of the QR code.

At 404, a plurality of ticket requests are received at a server from a plurality of computing devices via an Internet connection from the plurality of URLs. At 406, a number of ticket requests received from each URL is recorded. At 408, the plurality of performers are ranked according to the number of ticket requests received from their respective URLs to provide a ranking of the plurality of performers. At 410, a plurality of timeslots for the event to the plurality of performers according to the ranking of the plurality of performers. This can be done, for example, via a ranking of the timeslots by the organizer by desirability, with the highest ranked performer being given the most desirable timeslot, or by allowing the performers to rank the timeslots in advance and giving each performer their top remaining choice in order of ranking. In one example, an electronic communication to a highest ranking performer in the ranking of the plurality of performers requesting a selection among the plurality of timeslots. Once a response is received, another electronic communication is provided to a second ranked performer allowing them to select from the remaining timeslots. This is continued until all timeslots are assigned.

Figure 5:
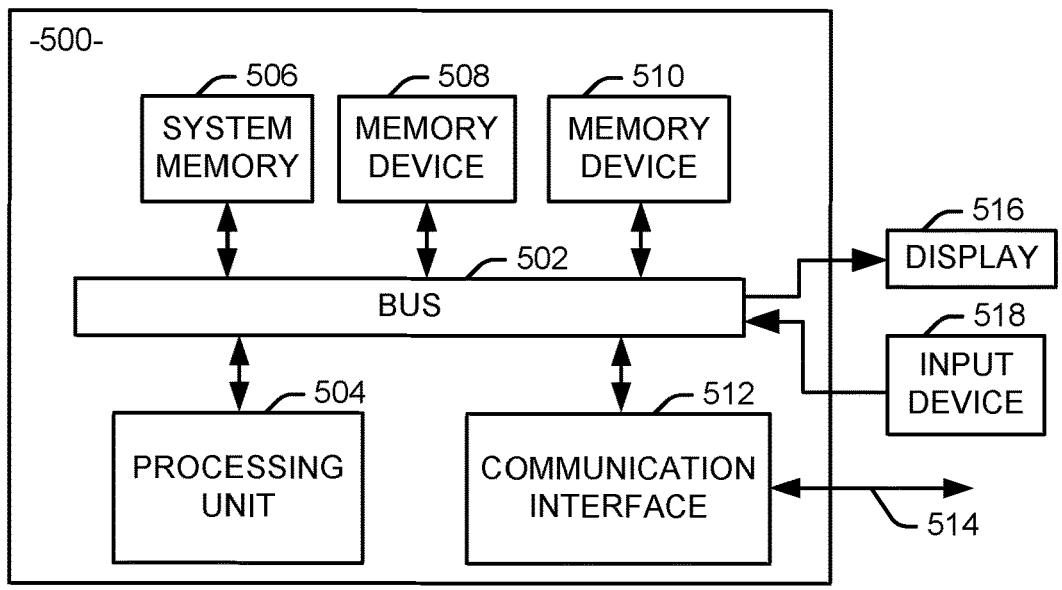
FIG. 5 is a schematic block diagram illustrating an exemplary system of hardware components capable of implementing examples of the systems and methods disclosed in FIGS. 1-4.

FIG. 5 is a schematic block diagram illustrating an exemplary system 500 of hardware components capable of implementing examples of the systems and methods disclosed in FIGS. 1-4. The system 500 can include various systems and subsystems. The system 500 can be a personal computer, a laptop computer, a workstation, a computer system, an appliance, an application-specific integrated circuit (ASIC), a server, a server blade center, a server farm, etc.

The system 500 can include a system bus 502, a processing unit 504, a system memory 506, memory devices 508 and 510, a communication interface 512 (e.g., a network interface), a communication link 514, a display 516 (e.g., a video screen), and an input device 518 (e.g., a keyboard and/or a mouse). The system bus 502 can be in communication with the processing unit 504 and the system memory 506. The additional memory devices 508 and 510, such as a hard disk drive, server, standalone database, or other non-volatile memory, can also be in communication with the system bus 502. The system bus 502 interconnects the processing unit 504, the memory devices 506-510, the communication interface 512, the display 516, and the input device 518. In some examples, the system bus 502 also interconnects an additional port (not shown), such as a universal serial bus (USB) port.

The processing unit 504 can be a computing device and can include an application-specific integrated circuit (ASIC). The processing unit 504 executes a set of instructions to implement the operations of examples disclosed herein. The processing unit can include a processing core.

The additional memory devices 506, 508, and 510 can store data, programs, instructions, database queries in text or compiled form, and any other information that can be needed to operate a computer. The memories 506, 508 and 510 can be implemented as computer-readable media (integrated or removable) such as a memory card, disk drive, compact disk (CD), or server accessible over a network. In certain examples, the memories 506, 508 and 510 can comprise text, images, video, and/or audio, portions of which can be available in formats comprehensible to human beings.

Additionally or alternatively, the system 500 can access an external data source or query source through the communication interface 512, which can communicate with the system bus 502 and the communication link 514.

In operation, the system 500 can be used to implement one or more parts of a system for assigning timeslots for an event including multiple performers in accordance with the present invention. Computer executable logic for implementing the timeslot assignment system resides on one or more of the system memory 506, and the memory devices 508, 510 in accordance with certain examples. The processing unit 504 executes one or more computer executable instructions originating from the system memory 506 and the memory devices 508 and 510. The term "computer readable medium" as used herein refers to a medium that participates in providing instructions to the processing unit 504 for execution, and can, in practice, refer to multiple, operatively connected apparatuses for storing machine executable instructions.

Implementation of the techniques, blocks, steps, and means described above can be done in various ways. For example, these techniques, blocks, steps, and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims.

What is claimed is:

1. A method comprising: generating, for each of a plurality of performers performing at an event, a unique uniform resource link (URL) from which the ticket portal can be accessed; redirecting traffic from each of the URLs associated with the plurality of performers to a landing page that allows a user to generate a ticket request at a server to provide a plurality of ticket requests for the event, each ticket request of the plurality of ticket requests comprising an indicator representing the unique URL from which the landing page was accessed, such that the indicator represents the performer of the plurality of performers associated with the unique URL; assigning a score to each of the plurality of performers based on the indicators associated with each performer across the plurality of ticket requests; ranking the plurality of performers according to the determined score for each performer to provide a ranking of the plurality of performers; and assigning a plurality of timeslots, each representing a period of time for which one of the plurality of performers will perform at for the event, to the plurality of performers according to the determined score for each of the plurality of performers, wherein each of the plurality of timeslots has an associated priority and the plurality of timeslots are assigned in order of priority to the plurality of performers in an order defined by the ranking.

2. The method of claim 1, further comprising generating a quick response (QR) code for the unique URL associated with each of the plurality of performers, such that a computing device associated with the user can access the unique URL for one of the plurality of performers by capturing an image of the QR code.

3. The method of claim 1, wherein each of the plurality of timeslots has an associated priority associated with each of the plurality of performers, and assigning the plurality of timeslots in order of priority to the plurality of performers in the order defined by the ranking comprises assigning to each performer, in the order defined by the ranking, a timeslot of a set of unassigned timeslots from the plurality of timeslots that has a highest priority associated with the performer.

4. The method of claim 1, wherein assigning the plurality of timeslots in order of priority to the plurality of performers in an order defined by the ranking comprises: generating an electronic communication to a first performer in the ranking of the plurality of performers requesting selection of a timeslot of the plurality of timeslots; receiving an electronic communication from the first performer indicating the selection of the timeslot; and generating an electronic communication to a second performer in the ranking of the plurality of performers requesting selection of a timeslot of a set of remaining timeslots from the plurality of timeslots.

* * * * *